Patented July 8, 1930

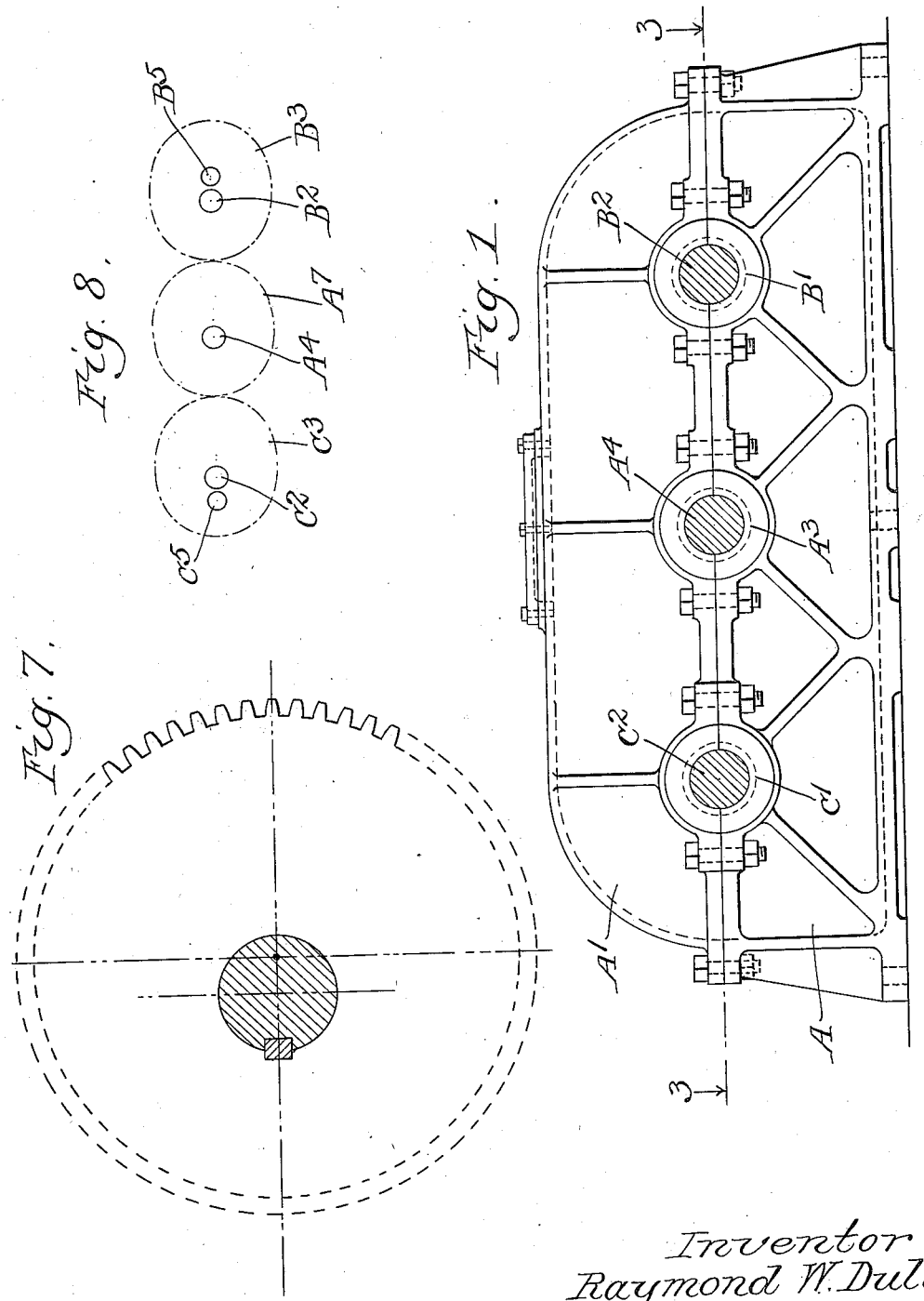

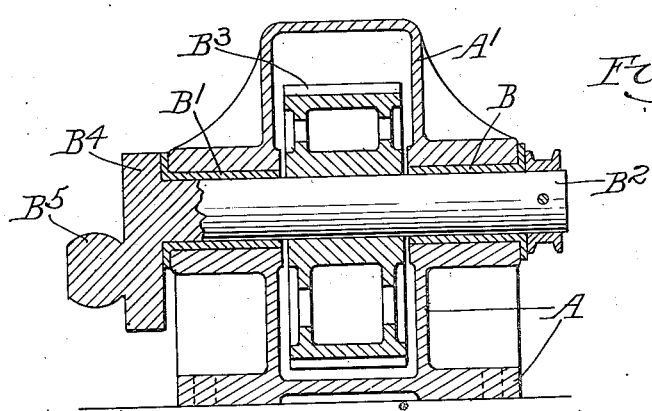
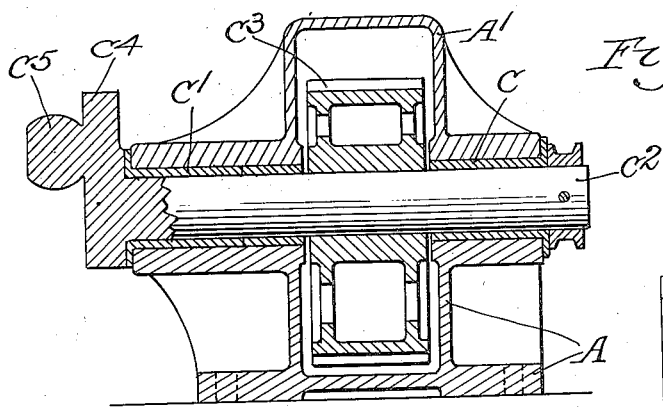
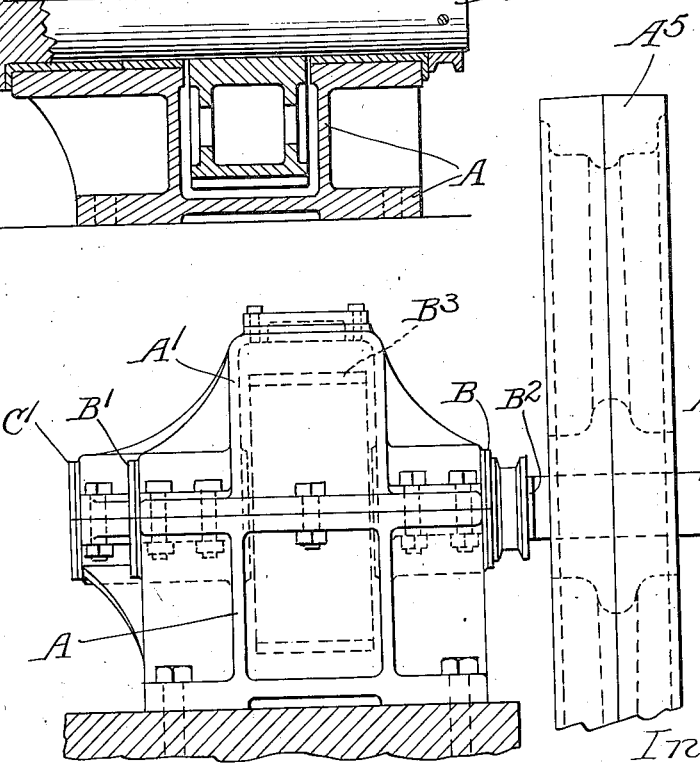

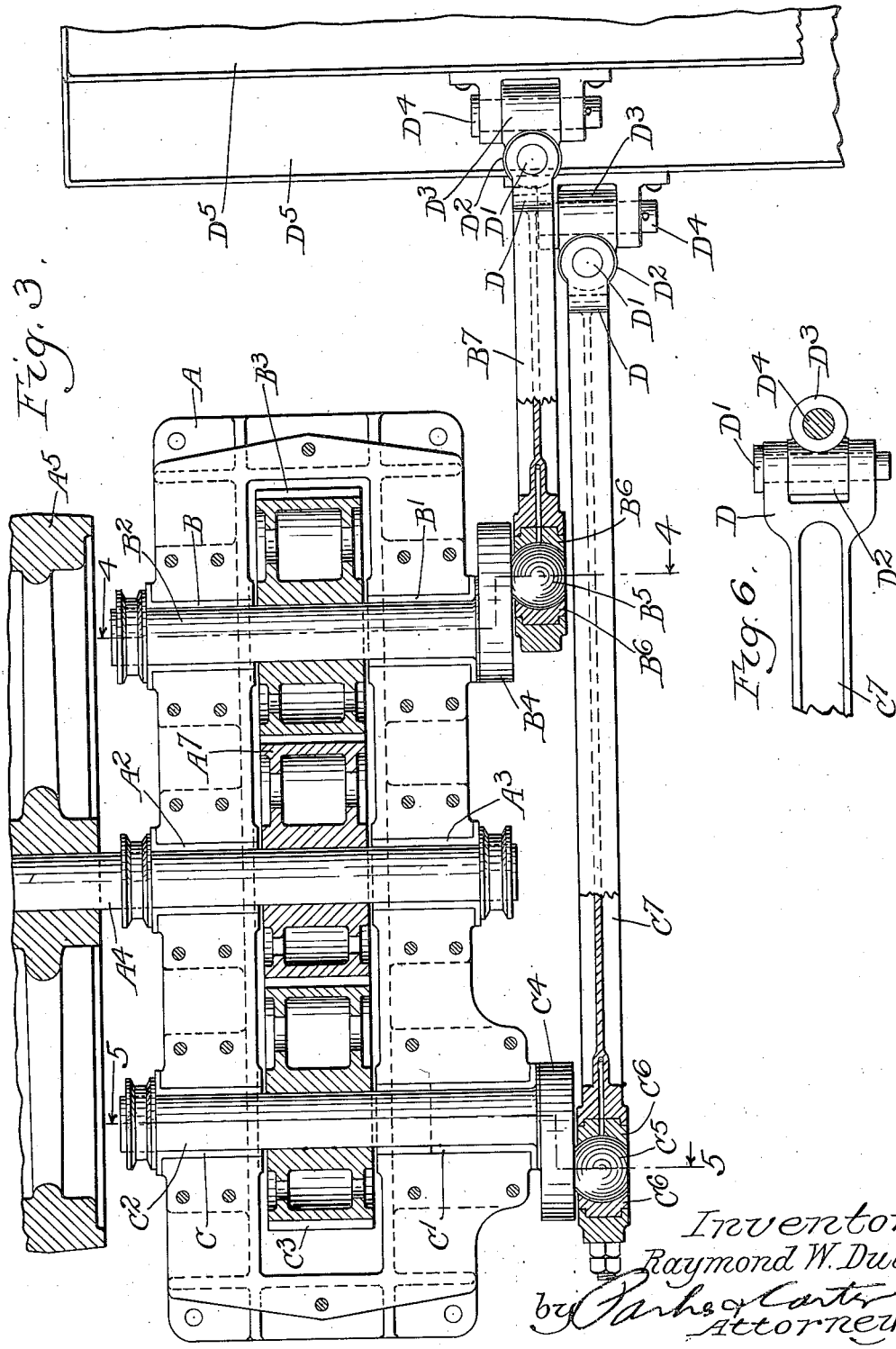

1,770,263

UNITED STATES PATENT OFFICE

RAYMOND W. DULL, OF LA GRANGE, ILLINOIS, ASSIGNOR TO LINK-BELT COMPANY, OF CHICAGO, ILLINOIS, A CORPORATION OF ILLINOIS

DRIVE FOR RECIPROCATING CONVEYERS

Application filed September 7, 1926. Serial No. 133,970.

My invention relates to improvements in a drive for reciprocating conveyers, screens and the like, and has for one object to provide a new and improved type of drive mechanism which imparts to a driven member a reciprocation differing in character on the forward and reverse strokes and wherein a plurality of driven members may be driven from a single drive head and be at all times in substantial balance.

I accomplish this by providing a pair of elliptic eccentric gears, the major diameter of the gears being in one form of the invention but slightly longer than the minor diameter, the eccentricity being but very slight. These gears are in mesh and one or more of the gears carries a shaft with a crank arm, the angular relation of the gears being such that the movements of connecting rods driven by the arms, when there are more than one, may be at all times in opposite phase.

In my preferred form the gears which carry the cranks are not in mesh with each other but are in mesh with a similar elliptic gear which does the driving, and there is therefore a central elliptic drive gear in mesh with two opposed driven gears, which gears drive the cranks.

My invention is illustrated more or less diagrammatically in the accompanying drawings, wherein Figure 1 is a side elevation with parts removed and parts in section;

Figure 2 is an end view with parts omitted;

Figure 3 is a section along the line 3—3 of Fig. 1;

Figure 4 is a section along the line 4—4 of Fig. 3;

Figure 5 is a section along the line 5—5 of Fig. 3;

Figure 6 is a side elevation of the connecting rod;

Figure 7 is a plan view of one of the gears;

Figure 8 is a diagrammatic side elevation showing the gears and the relation between them and the cranks.

Like parts are indicated by like characters throughout.

A is a bed plate, $A^1$ a cover plate. Mounted in this bed plate are a plurality of bearings. The bearings $A^2$ $A^3$ carry the drive shaft $A^4$, on which is mounted a flywheel pulley $A^5$. This drive shaft extends out to an outer bearing $A^6$ at a point removed from the drive head, supported by this bearing which carries the load. Rigidly keyed to the shaft $A^4$ is an elliptic drive gear $A^7$.

B $B^1$ are bearings for the tail shaft $B^2$. This shaft carries an elliptic gear $B^3$ in mesh with the gear $A^7$ between the bearings B $B^1$. At its outer end it carries a crank $B^4$ with a ball pin $B^5$, upon which may be mounted a spherical or other bearing $B^6$ in the end of the shorter connecting rod $B^7$.

At the head end of the housing A are bearings C $C^1$ the bearing $C^1$ extending out beyond the housing farther than the bearing $B^1$, the housing being reinforced to that end. In these bearings is rotatably mounted a shaft $C^2$ carrying an elliptic gear $C^3$ in mesh with the gear $A^7$ at a point 180° removed from the gear $B^3$. The shaft $C^2$ carries a crank $C^4$ with ball pin $C^5$ and spherical bearing $C^6$ in the end of the longer connecting rod $C^7$. Other connecting means, such as cross heads might be used.

The ends of each of these connecting rods are substantially identical and are forked as at D. Pivoted in the fork on a pin $D^1$ is a sleeve $D^2$ integral with the sleeve $D^3$ at right angles thereto. A pin $D^4$ in the sleeve $D^3$ is connected to the conveyer, screen or other apparatus $D^5$ intended to be reciprocated by the drive head.

Referring to Figure 7, it will be noted that the gear is just slightly out of round. For instance, in one form the long diameter is 28 inches, the short diameter is substantially 27¾ inches. The center of rotation of the shaft is approximately 2 inches out of center with respect to the center of the gear and located on the major diameter.

By the arrangement shown the material moves in the same direction on the two conveyer members driven by the head, but it would be possible, of course, by changing the phase of operation or the direction in which the connecting rods extend to the work to so adjust the device that the material would travel in opposite directions on the two conveyer members, if that were desired. This would result in a decrease in the per cent of balance of the apparatus. Under some conditions the sacrifice of balance would be justified, under other conditions not.

It will be understood, of course, that in the position shown in Figure 8 the longer radius of the driving gear is working against the shorter radius of the tail gear, and therefore the angular velocity of that gear is at a maximum, whereas the shorter radius of the drive gear is working against the longer radius of the head end gear and therefore the head end gear angular velocity is at a minimum. At 180° from this the relation will have been gradually reversed.

Obviously it would be possible to use only a driving and a driven gear and dispense with the second driven gear and its crank. In this case but a single screen or conveyer could be reciprocated and the machine would then be out of balance, or it might be possible to have two cranks each of them associated with a single driven gear—say, for instance, at opposed ends of the gear shaft, although they might both be on the same end. Under these conditions if two screen conveyers are reciprocated material would travel in opposite directions along such device being cause the accelerated motion would be in opposite directions.

While my device is primarily intended for application to screens, it might equally well be adapted to conveyers, pumps, or any other mechanism where it is desired to translate rotary motion to reciprocatory motion.

I have preferred to show the axes of the two driven gears in the same plane as the driving gear, but obviously the driven gears may be arranged about the periphery of the driving gear in any desired arrangement. They may be above and below, or they may be separated by an angle of 180° or less as the case may be, and to get satisfactory operation under such conditions it is only necessary properly to proportion the parts and properly to fix the angular position of the driving crank with respect to the major and minor axes of the driven gears.

Although I have shown an operative device, still it will be obvious that many changes might be made in size, shape and arrangement without departing materially from the spirit of my invention; and I wish therefore that my showing be taken as in a sense diagrammatic.

I claim:

1. The combination with a conveyer comprising a pair of oppositely reciprocating generally horizontal members, of driving means therefor comprising three parallel shafts whose axes are located all in the same generally horizontal plane and are perpendicular to the line of reciprocation, means for driving the central shaft, eccentric elliptic gears rigidly mounted one on each shaft, the gear on the central shaft being in mesh with the gears on the other two, cranks spaced 180° in phase carried by the two end shafts, connecting rods leading one from each crank to one of the reciprocating members.

2. The combination with a conveyer comprising a pair of oppositely reciprocating generally horizontal members, of driving means therefor comprising three parallel shafts whose axes are located all in the same generally horizontal plane and are perpendicular to the line of reciprocation, means for driving the central shaft, eccentric gears rigidly mounted one on each shaft, the gear on the central shaft being in mesh with the gears on the other two, cranks spaced 180° in phase carried by the two end shafts, connecting rods leading one from each crank to one of the reciprocating members.

3. In combination with a conveyer comprising a pair of oppositely reciprocating generally horizontal members of driving means therefor comprising a closed housing, three shafts mounted for rotation in said housing and located in a plane parallel with the plane of reciprocating of the conveyer, eccentric gears contained within said housing rigidly mounted one upon each of said shafts and so disposed that the gears on either two adjacent shafts are always in mesh, the central shaft extending outwardly from the housing, means for driving it, the two end shafts extending beyond the housing in a direction opposed to the central shaft, crank discs carried thereby, connecting rods and universal connections interposed between the ends of said rods and the conveyer and the discs.

Signed at Chicago, county of Cook and State of Illinois, this 24th day of August, 1926.

RAYMOND W. DULL.